(No Model.)

H. SCHMELZ.
TOILET POWDER BOX.

No. 322,977. Patented July 28, 1885.

WITNESSES:

INVENTOR
Henry Schmelz
BY
ATTORNEYS.

N. PETERS, Photo-Lithographer, Washington, D.C.

UNITED STATES PATENT OFFICE.

HENRY SCHMELZ, OF NEW YORK, N. Y.

TOILET-POWDER BOX.

SPECIFICATION forming part of Letters Patent No. 322,977, dated July 28, 1885.

Application filed February 25, 1884. (No model.)

*To all whom it may concern:*

Be it known that I, HENRY SCHMELZ, of the city, county, and State of New York, have invented certain new and useful Improvements in Powder-Boxes, of which the following is a specification.

This invention has reference to an improved powder-box for ladies' use, which has the advantage that it can be used either as a puff-box or for sprinkling the powder; and the invention consists of a powder-box provided with a detachable dome-shaped cover, said cover being provided with a raised seat and a perforated sprinkler above said seat, and with a detachable cap for covering said sprinkler.

Figure 1:
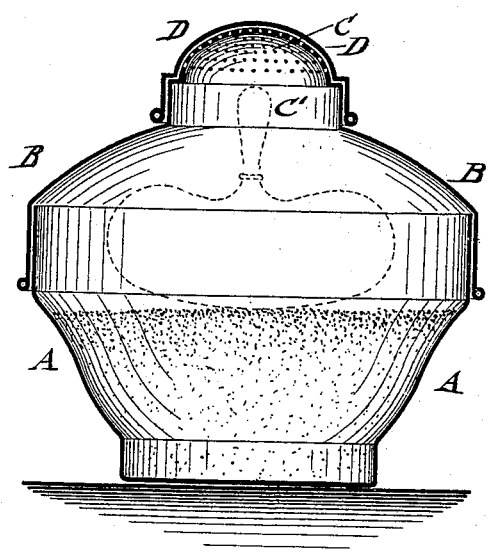
Figure 2:
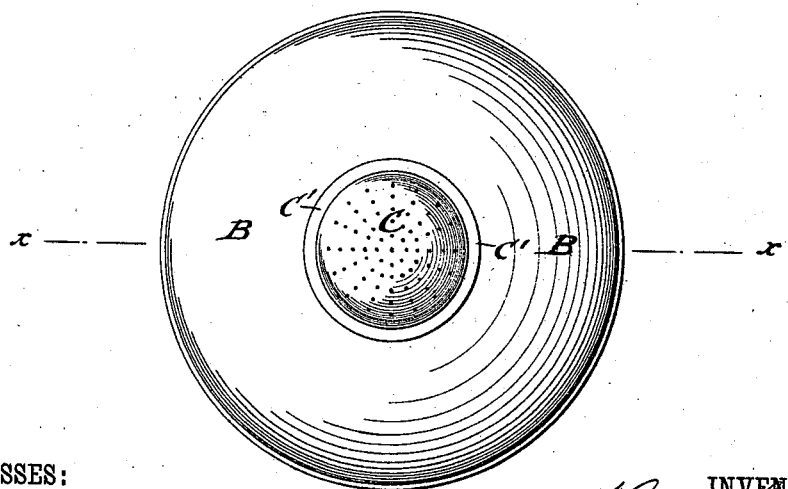

In the accompanying drawings, Figure 1 represents a vertical central section of my improved powder-box on line $x$ $x$, Fig. 2; and Fig. 2 is a plan of the same with the cap of the sprinkler removed.

Similar letters of reference indicate corresponding parts.

A in the drawings represents the body of a box of suitable shape and size, which body is spun or stamped of suitable metal.

B is the dome-shaped cover, which is tightly fitted by screwing or otherwise to the upper part of the body A. The cover B is provided at its middle portion with a raised vertical seat, C', and with a perforated sprinkler, C, over which is placed a detachable cap, D, that corresponds to the size and shape of the sprinkler C, and that is screwed or otherwise fitted around the raised seat C'. By detaching the cap D the box may be used for sprinkling the powder contained therein, while by removing the cover the powder may be taken directly from the interior of the box, as found most convenient.

The dome-shaped cover and raised sprinkler give room for a puff that is placed at the inside of the box. The box is adapted for baby-powder, rice-powder for ladies, and other similar powders.

I am aware that boxes for powdered sugar, pepper, and other purposes have been used heretofore, consisting of a body with a detachable perforated cover.

The cover is provided with a depression and offset around the perforated portion, said perforated portion being closed by a detachable cap, which is fitted on the offset so as to be on a level with the top of the cap. In my powder-box the cover is dome-shaped and provided with a raised seat and a perforated portion or sprinkler above said seat, the perforated portion being closed by a detachable cap that fits to the raised seat. By arranging the tightly-closing cap over the perforated portion or sprinkler the accidental escape and waste of powder when the box is thrown about is prevented. A powder-box is consequently furnished which can be used, as required, with equal convenience as a puff-box or for sprinkling purposes, whereby it is more convenient for ladies' and family use.

Having thus described my invention, I claim as new and desire to secure by Letters Patent—

A powder-box composed of a body, A, and of a dome-shaped cover, B, said cover having a raised seat, C', and a perforated portion or sprinkler, C, the latter being covered by a removable cap, D, whereby the box may be used as a puff-box or a sprinkler, substantially as set forth.

In testimony that I claim the foregoing as my invention I have signed my name in presence of two subscribing witnesses.

HENRY SCHMELZ.

Witnesses:
PAUL GOEPEL,
SIDNEY MANN.